Patented Oct. 11, 1938

2,132,671

UNITED STATES PATENT OFFICE 2,132,671

CONDENSATION PRODUCTS

Walter Bauer, Darmstadt, Germany, assignor to Röhm & Haas Company, Philadelphia, Pa.

No Drawing. Application December 20, 1937, Serial No. 180,834. In Germany December 28, 1936

9 Claims. (Cl. 260—2)

This invention relates to condensation products of methacrylic amide and formaldehyde. It relates more particularly to the polymeric form of such products, obtained by the action of formaldehyde on methacrylic amide either in the polymeric or monomeric form, subject in the latter case to a simultaneous or subsequent polymerization of the product.

This application is a continuation-in-part of my copending application Serial No. 108,115, filed October 28, 1936.

Methacrylic amide is a crystalline substance having the formula $CH_2=C(CH_3)CONH_2$ which melts at 108° C. and is soluble in water and most organic solvents such as methyl and ethyl alcohols, acetone, ethyl acetate, benzene, petroleum ether, etc. It polymerizes readily to a glassy or powdery material which may or may not be soluble in water, depending on the conditions under which it was polymerized. When the methacrylic amide is polymerized in aqueous solution, the result is a highly viscous material which will yield films or blocks of glass-clear polymer on evaporation of the water. Such polymers, however, swell readily in water, and even form thick gels. For many purposes it is desirable to render the polymeric methacrylic amide insoluble in water or at least to reduce the effect of water thereon to a minimum.

It is an object of this invention to provide a method whereby the polymeric methacrylic amide can be converted to a substance of greatly increased resistance to the action of water and other liquids which have a solvent or swelling action on the ordinary polymeric methacrylic amide.

This may be accomplished by long continued heating of the aqueous solution of the polymer but it is preferable to treat the soluble polymer with formaldehyde. This treatment may be carried out in the aqueous solution directly, or a film of the polymer may be prepared and either immersed in an aqueous solution of formaldehyde or exposed to the vapors thereof for various lengths of time depending on the desired result. Polymeric methacrylic amide which is soluble in inert organic liquids may be treated in such solution with para-formaldehyde or the monomeric amide and the aldehyde can be dissolved in water or other suitable solvent and heated in which case polymerization and condensation of the amide with the aldehyde take place simultaneously.

When the reaction between the polymeric methacrylic amide and the formaldehyde is carried out in an aqueous medium, it is often desirable to have a polyhydric alcohol such as glycol or glycerine present. These act as plasticizers for the finished product especially when it is to be used for purposes where resistance to water is not paramount.

The condensation product may be still further hardened by carrying out the condensation in the presence of water-soluble salts of a di- or trivalent metal such as zinc, aluminum, iron or chromium. These salts may be the formates, acetates, chlorides, sulfates, etc. Aluminum formate has been found to be very effective in hardening the condensation product. The salts exert the same effect when they are present during the combined polymerization and condensation process, or when they are used to treat the final product, as they do when present during the condensation of the polymethacrylic amide and the formaldehyde.

The methacrylic amide, in monomeric or polymeric form, may be used alone or it may be used as a joint polymer with other polymerizable compounds such as esters of acrylic and methacrylic acids, vinyl esters, etc.

Example 1

A solution is made up containing four parts by weight of polymeric methacrylic amide, three parts of glycerine, eighteen parts of water, two parts of 30% aqueous formaldehyde, five parts of 5% boric acid solution and one part of aluminum formate. This solution is then heated for one hour at 70° C. The aldehyde and amide react but no precipitate is formed during this time. The solution is then poured out on a glass plate and dried at about 50° to 60° C. In this manner a film is formed which is insoluble in water and which exhibits practically no swelling even on immersion in water for several days. Instead of preparing a film as above, a thicker slab or block may be prepared in the same way.

Example 2

2.1 parts of monomeric methacrylic amide is dissolved in 4.0 parts of toluene and 0.8 parts of para-formaldehyde added. The solution is then heated for several hours. At first the solution is perfectly clear but as the heating is continued a solid precipitate forms which is insoluble in all ordinary solvents.

Example 3

A film prepared by evaporating a solution consisting of ten parts of polymeric methacrylic amide, ten parts of glycerine and eighty parts of water is immersed at room temperature in a 10% formaldehyde solution for 2 to 6 hours. The resulting film is insoluble in water. By using 20% formaldehyde solution the same result can be achieved in shorter time. Increasing the temperature also shortens the time necessary for hardening the film.

Example 4

A film prepared as in Example 3 is hardened and rendered insoluble in water by suspending it over a 30% formaldehyde solution at ordinary or somewhat elevated temperature for a period of 5 to 20 hours.

Example 5

Five parts of 30% formaldehyde solution is added to one hundred parts of a 10% solution of monomeric methacrylic amide and the resulting solution heated to 70° C. for 1½ hours. At the end of this time a water-insoluble gel is formed. Using ten parts of 30% formaldehyde and heating as above the insoluble gel is formed in about 45 minutes. If it is desired to prepare films or blocks from these solutions by pouring or casting, the heating time should be reduced to about one-half and the final hardening carried out after evaporation of the water. By drying such films or blocks two to three hours at 90° C. a glass-clear product is obtained which is not dissolved by water.

In all cases the hardening may be accelerated by using larger proportions of formaldehyde and by carrying out the process at elevated temperatures.

The material thus prepared is thermoplastic and can be used for molding purposes, either in powder or sheet form, in the type of apparatus usually employed for such molding.

Films of these polymeric condensation products can be used for coating other films such as those made from cellulose esters, polyvinyl esters, polyacrylic and methacrylic esters, polystyrol, etc. Plasticizers may also be added such as polyhydric alcohol like glycol or glycerine and their ethers and esters. These plasticizers improve the stability of the solutions of polymethacrylic acid amide. In some cases it may be necessary to use an adhesive layer to unite the base film with that of the polymethacrylic amide-formaldehyde film. Suitable adhesives are balsams and thin film of polyacrylic acid esters. Films coated with the polymethacrylic amide-formaldehyde condensations product may be used in a manner similar to such films coated with gelatine, as for example in photographic work. The condensation products described herein have a much greater resistance to water than hardened gelatine. As compared to the latter product the new products have the decided advantage that they may be prepared always in standard quality.

I claim:

1. In the process of preparing condensation products from methacrylic amide and formaldehyde the improvement which comprises carrying out the condensation in the presence of a soluble salt of a metal of the group consisting of aluminum, zinc, iron and chromium.

2. In the process of condensing polymeric methacrylic amide with formaldehyde the improvement which comprises carrying out the condensation in the presence of a soluble salt of a metal of the group consisting of aluminum, zinc, iron and chromium.

3. In the process of preparing condensation products from methacrylic amide and formaldehyde the improvement which comprises carrying out the condensation in the presence of a soluble salt of aluminum.

4. In the process of condensing polymeric methacrylic amide with formaldehyde the improvement which comprises carrying out the condensation in the presence of a soluble salt of aluminum.

5. In the process of preparing condensation products from methacrylic amide and formaldehyde the improvement which comprises carrying out the condensation in the presence of aluminum formate.

6. In the process of condensing polymeric methacrylic amide with formaldehyde the improvement which comprises carrying out the condensation in the presence of aluminum formate.

7. The process which comprises condensing a joint polymer of methacrylic amide and another polymerizable organic compound with formaldehyde in the presence of a soluble salt of a metal of the group consisting of aluminum, zinc, iron and chromium.

8. The process which comprises condensing a joint polymer of methacrylic amide and another polymerizable organic compound with formaldehyde in the presence of a soluble salt of aluminum.

9. The process which comprises condensing a joint polymer of methacrylic amide and an ester of one of the group consisting of acrylic and methacrylic acids with formaldehyde in the presence of a soluble salt of a metal of the group consisting of aluminum, zinc, iron and chromium.

WALTER BAUER.